Nov. 21, 1967   L. O. BACHER   3,353,318

INSULATED JOINT FOR PANEL WALLS

Filed March 28, 1966

INVENTOR
Leo O. Bacher

BY *Shley & Shley*

ATTORNEYS

United States Patent Office 3,353,318
Patented Nov. 21, 1967

1

3,353,318
INSULATED JOINT FOR PANEL WALLS
Leo O. Bacher, Waco, Tex., assignor to McAx Corporation, McGregor, Tex., a corporation of Texas
Filed Mar. 28, 1966, Ser. No. 538,056
7 Claims. (Cl. 52—403)

This invention relates to new and useful improvements in insulated joints for panel walls.

It is customary to construct walls of prefabricated panels having spaced interior and exterior skins or sheets of relatively thin metal which may be prefinished, such as by porcelain enamel. A core of suitable insulating material is usually sandwiched between the skins or sheets which have flanges or legs on their upright margins coacting to form tongue and groove joints between adjacent panels whereby metal to metal contact is provided between the panels. The resulting thermal conductivity of the joints is very undesirable when the interior and exterior sheets of the panels are exposed to highly different temperatures. Accordingly, it is most desirable to insulate the joints between adjacent panels, so as to minimize the transfer of thermal differentials, by means of gaskets which prevent the flanges of the interior sheets from engaging the flanges of the exterior sheets and which provide dead air spaces between said interior and exterior flanges. The gaskets are disposed in coacting pairs, with one gasket being mounted on the tongue portion and the other gasket being mounted on the groove portion of each joint, and are arranged to space apart the interior and exterior flanges of each panel as well as the interior and exterior flanges of adjacent panels.

A construction designed to carry out the invention will be hereinafter described, together with other features of the invention.

Figure 1:
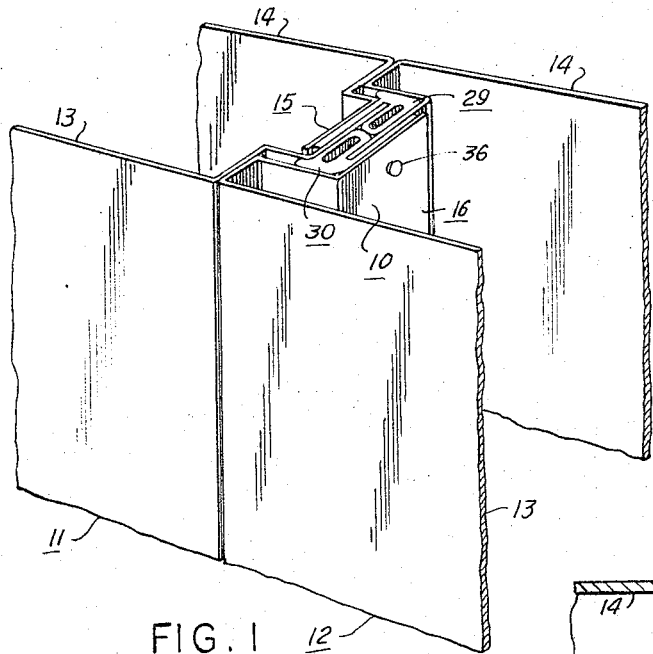
Figure 2:
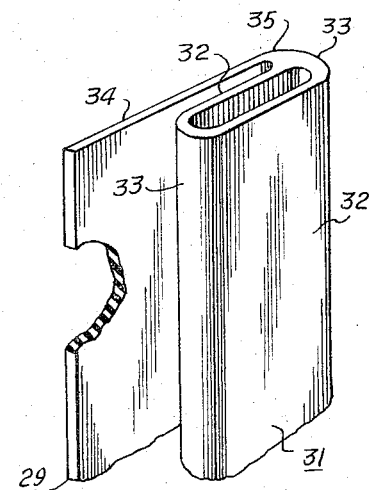
Figure 3:
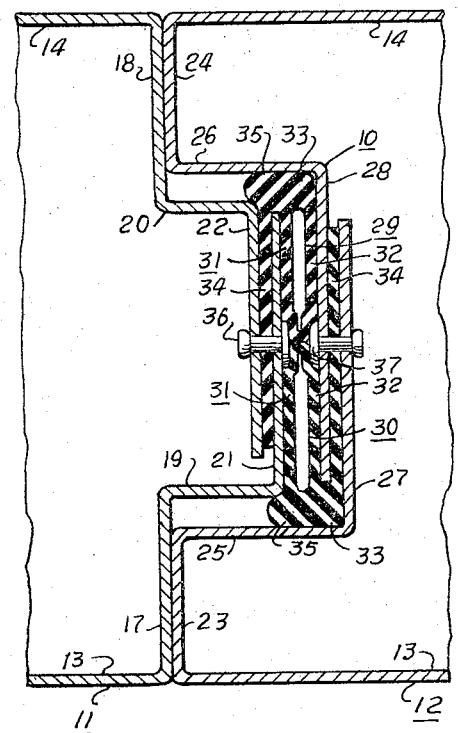
Figure 4:
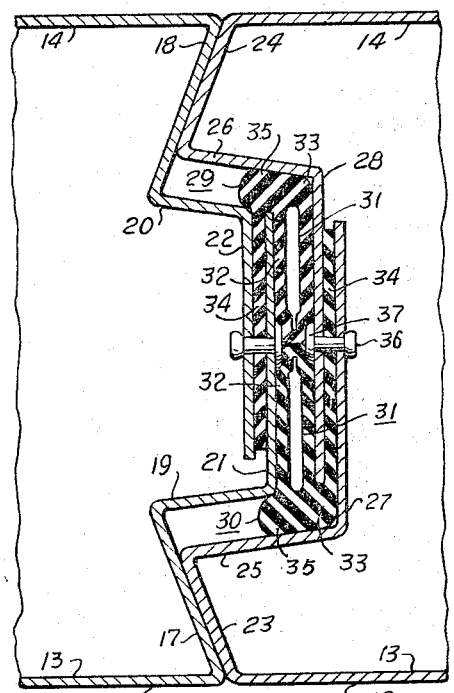

The invention will be more readily understood from a reading of the following specification and by reference to the accompanying drawing wherein examples of the invention are shown, and wherein:

FIG. 1 is a perspective view of a portion of an insulated joint between adjacent wall panels constructed in accordance with the invention, FIG. 2 is a perspective view of a portion of one of the gaskets, FIG. 3 is an enlarged, horizontal, cross-sectional view of the joint, and FIG. 4 is a view, similar to FIG. 3, of a slightly modified joint.

In the drawing, the numeral 10 designates generally a typical insulated joint between adjacent wall panels 11 and 12 having spaced interior and exterior sheets or skins 13 and 14 of relatively thin metal which may be porcelain-enameled or otherwise permanently finished. Although not shown, a core of suitable insulating material may be, and usually is, sandwiched between the skins or sheets 13 and 14. The panels 11 and 12, which may be identical, each have a coextensive tongue portion 15 formed on one upright margin thereof and a complementary groove portion 16 on its other upright margin for mating engagement with the groove and tongue portions of adjacent panels. As best shown in FIG. 3, each tongue portion 15 includes a first pair of alined, transverse flanges or legs 17–18 extending inwardly from the interior and exterior sheets 13 and 14, respectively, a second pair of flanges or legs 19–20 extending longitudinally outward from the first pair of flanges 17–18 in parallel, spaced relation to said sheets as well as to each other, and a third pair of flanges or legs 21–22 extending transversely inward from the second pair of flanges or legs 19–20 in parallel relation to said first pair of flanges and in parallel, closely-spaced relation to each other.

2

Each complementary groove portion 16 includes three pairs of flanges or legs 23–24, 25–26 and 27–28 which are substantially identical to the corresponding, outermost, transverse flanges of the tongue portion 15, the first pair of flanges 23–24 being of less width than the flanges 17–18 of said tongue portion, the second pair of groove flanges 25–26 being of much greater width than the intermediate or second flanges 19–20 of said tongue portion, and the third pair of groove flanges 27–28 being of slightly greater width than the innermost, transverse flanges 21 and 22 of said tongue portion. The flanges 21 and 28 are disposed in overlying closely-spaced relation to the flanges 22 and 27, respectively.

It is noted that the invention is not dependent upon the illustrated parallel, right angular relationship of the flanges since it is only necessary for the corresponding pairs of flanges to be in parallel relationship to each other. The first pairs of flanges 17–18 and 23–24 may be disposed at an angle to each other so as to converge toward or away from the groove portion so long as the tongue flanges are parallel to the groove flanges (FIG. 4). The second pair of the tongue flanges 19–20 may converge toward the groove portion, while the second pair of the groove flanges 25–26 may diverge in parallel relation to said tongue flanges. Although the parallel relationship of the third pairs of flanges 21–22 and 27–28 is essential to the invention, said flanges need not be parallel to the first pairs of flanges and may extend at an angle thereto.

In order to provide a more rigid and stronger structure as well as eliminate the necessity for batten strips, the first pairs of flanges 17–18 and 23–24 are adapted to abut one another. This metal to metal contact provides thermal conductivity which is very undesirable when the exterior and interior sheets 13 and 14 of the panels 11 and 12 are subjected to highly different temperatures, such as the outer walls of buildings. Therefore, it is most desirable to insulate each joint between adjacent wall panels and a pair of coacting gaskets 29 and 30, or rubber, plastic or other suitable elastic material, is provided for this purpose.

Each of the gaskets 29 and 30, which are coextensive with the tongue and groove portions 15 and 16 of the joint 10 and which are identical, includes an elongate, tubular body 31 of flat, oval shape in cross-section. As best shown in FIG. 2, the body has opposed, substantially flat side walls 32 connected by opposed arcuate end walls 33 and is of sufficient rigidity to maintain the side walls in spaced relationship when said body is undeformed. A flat, coextensive appendage or extension 34 projects laterally from one of the end walls 33 in parallel, closely-spaced relation to one of the side walls 32 of each body 31 and is of much greater width than said side wall so as to extend an appreciable distance beyond the other of said end walls, being nearly twice the width of said side wall. The appendage 34 has an inner arcuate margin 35 for merging with and forming a continuation of the curvature of the end wall from which it projects.

The appendages 34 of the gaskets 29 and 30 are adapted to be confined between and fastened to the innermost transverse flanges 21–22 and 27–28, respectively, by a plurality of suitable rivets 36 which extend through and secure said flanges to each other. An enlarged flat head 37 is formed on one end of each rivet 36 and preferably, overlies the outer surface of the flange 21 or 28 adjacent the outer or free end wall 33 of the body 31 of the gasket attached to said flange. The body of the gasket 29 is directed inwardly in overlying relation to the flange 21, while the body of the gasket 30 is directed outwardly in overlying relation to the flange 28 whereby the free or outer margins of the gasket bodies abut and are deformed by engagement with the rivet heads 37. It is noted that the transverse width or thickness of the undeformed gasket bodies is slightly greater than the distance between the flanges 21 and 28 of the assembled joint 10 so that said bodies are deformed into sealing engagement with the flanges 21 and 28 as well as each other.

When the joint 10 is assembled by nesting the tongue and groove portions 15 and 16 of adjacent panels 11 and 12, the outer side walls 32 of the body 31 of the gasket 29 engages the transverse flange 28 of the groove portion and the inner end wall 33 as well as the inner arcuate margin 35 of the appendage 34 engage the longitudinal flange 26 of said groove portion. The gasket 30 has the inner end wall 33 of its body 31 and appendage margin 35 in engagement with the longitudinal flange 25 and the outer side wall 32 of its body is adapted to engage the transverse flange 21. Since the bodies 31 of the gaskets are of slightly greater width than the space between the flanges 21 and 28, said bodies are deformed as shown in FIGS. 3 and 4 to positively seal off between the tongue and groove portions of the joint. The inner end wall portions of the gasket bodies tend to increase in thickness and fill the corners between the flanges 25–27 and 26–28, while the appendage margins flow into the spaces between the flanges 19–25 and 20–26. Although the thickness of the bodies 31 and the size of their bores are decreased, said bores remain to provide dead air spaces for insulating the joint.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. An insulated joint for adjacent wall panels having spaced interior and exterior sheets including coextensive first flanges extending transversely inward from the upright margins of the sheets, coextensive second flanges extending longitudinally outward from the transverse first flanges of one of the upright margins of each sheet and longitudinally inward from the transverse flanges of the other of said upright margins, coextensive third flanges extending transversely from the longitudinal second flanges in parallel closely-spaced relation to each other, whereby the flanges of said one of said margins coact to form a tongue portion and the flanges of said other of said margins coact to form a groove portion complementary to the tongue, and a pair of coextensive gaskets for sealing off between the groove and tongue portions, each gasket having an elongate body for engagement with the outermost third flanges of said tongue and groove portions and adapted to be deformed when the joint is assembled, each body having a substantially flat coextensive extension projecting laterally therefrom for confinement between the parallel closely spaced third flanges whereby one of the gaskets is adapted to be mounted on said tongue portion and the other of said gaskets is adapted to be mounted on said groove portion.

2. An insulated joint as set forth in claim 1 including means for fastening the gaskets to the tongue portion and to the groove portion.

3. An insulated joint as set forth in claim 1 including means for fastening the extensions of the gaskets to the transverse third flanges of the tongue and groove portions.

4. An insulated joint as set forth in claim 1 wherein the body of each gasket is tubular.

5. An insulated joint as set forth in claim 4 including means for fastening the extensions of the gaskets to the transverse third flanges of the tongue and groove portions.

6. An insulated joint as set forth in claim 1 wherein the body of each gasket is of flat tubular shape and has the substantially flat extension projecting from one longitudinal end thereof in parallel closely spaced relation to one of the flat portions thereof.

7. An insulated joint as set forth in claim 6 including means for fastening the extensions of the gaskets to the transverse third flanges of the tongue and groove portions.

References Cited

UNITED STATES PATENTS

| | | | |
|---|---|---|---|
| 2,967,333 | 1/1961 | Metzinger | 52—403 |
| 3,014,560 | 12/1961 | Krauss | 52—397 |
| 3,024,074 | 3/1962 | Jacobs et al. | 49—498 |
| 3,106,422 | 10/1963 | White | 49—498 |
| 3,313,073 | 4/1967 | Matthews | 52—593 |

FOREIGN PATENTS

| | | |
|---|---|---|
| 83,005 | 6/1957 | Denmark. |

REINALDO P. MACHADO, *Primary Examiner.*